(12) United States Patent
Kim et al.

(10) Patent No.: US 10,771,213 B2
(45) Date of Patent: Sep. 8, 2020

(54) METHOD FOR TRANSMITTING FEEDBACK INFORMATION FOR DM-RS BASED DOWNLINK TRANSMISSION IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kijun Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/090,150

(22) PCT Filed: Mar. 31, 2017

(86) PCT No.: PCT/KR2017/003570
§ 371 (c)(1),
(2) Date: Sep. 28, 2018

(87) PCT Pub. No.: WO2017/171485
PCT Pub. Date: Oct. 5, 2017

(65) Prior Publication Data
US 2019/0312696 A1    Oct. 10, 2019

Related U.S. Application Data

(60) Provisional application No. 62/316,549, filed on Mar. 31, 2016.

(51) Int. Cl.
*H04L 5/00* (2006.01)
*H04W 76/27* (2018.01)
(Continued)

(52) U.S. Cl.
CPC ......... *H04L 5/0048* (2013.01); *H04B 7/0456* (2013.01); *H04B 7/06* (2013.01);
(Continued)

(58) Field of Classification Search
None
See application file for complete search history.

(56) References Cited

U.S. PATENT DOCUMENTS 8,730,989 B2    5/2014    Pelletier et al.
9,825,742 B2 *  11/2017   Nam ..................... H04L 5/0023
(Continued)

FOREIGN PATENT DOCUMENTS

WO    2015120612    8/2015

OTHER PUBLICATIONS

PCT International Application No. PCT/KR2017/003570, Written Opinion of the International Searching Authority dated Jul. 10, 2017, 16 pages.

*Primary Examiner* — Otis L Thompson, Jr.
(74) *Attorney, Agent, or Firm* — Lee, Hong, Degerman, Kang & Waimey

(57) ABSTRACT

Disclosed is a method by which a terminal reports channel status information (CSI) to a base station in a wireless communication system, so as to perform a demodulation reference signal (DM-RS)-based downlink transmission through a multi-layer. Particularly, the method comprises the steps of: receiving a channel status information-reference signal (CSI-RS) from the base station; calculating the CSI on the basis of the CSI-RS, on the assumption that a dual pre-coder composed of a first pre-coder and a second pre-coder is applied; and reporting the calculated CSI to the base station, wherein column vectors of the second pre-coder are composed of a single discrete Fourier transform (DFT) vector.

8 Claims, 8 Drawing Sheets

(51) Int. Cl.
- *H04B 7/06* (2006.01)
- *H04W 72/12* (2009.01)
- *H04B 7/0456* (2017.01)
- *H04L 5/14* (2006.01)

(52) U.S. Cl.
CPC ......... *H04B 7/0626* (2013.01); *H04B 7/0632* (2013.01); *H04W 72/12* (2013.01); *H04W 76/27* (2018.02); *H04B 7/0486* (2013.01); *H04L 5/14* (2013.01)

(56) References Cited

U.S. PATENT DOCUMENTS

| | | | | |
|---|---|---|---|---|
| 10,476,575 | B2* | 11/2019 | Park | H04B 7/06 |
| 2013/0058424 | A1 | 3/2013 | Enescu et al. | |
| 2014/0177683 | A1 | 6/2014 | Krishnamurthy et al. | |
| 2014/0177744 | A1* | 6/2014 | Krishnamurthy | H04B 7/0469 375/267 |
| 2014/0177745 | A1* | 6/2014 | Krishnamurthy | H04B 7/0413 375/267 |
| 2014/0226702 | A1 | 8/2014 | Onggosanusi et al. | |
| 2015/0124688 | A1* | 5/2015 | Xu | H04B 7/0452 370/312 |
| 2016/0157218 | A1* | 6/2016 | Nam | H04B 7/0456 370/329 |
| 2016/0352402 | A1* | 12/2016 | Park | H04B 7/10 |
| 2016/0380734 | A1* | 12/2016 | Wang | H04L 5/0057 370/329 |
| 2017/0033912 | A1* | 2/2017 | Onggosanusi | H04B 7/0626 |
| 2018/0083676 | A1* | 3/2018 | Wei | H04B 7/0626 |
| 2018/0102817 | A1* | 4/2018 | Park | H04B 7/04 |
| 2018/0115357 | A1* | 4/2018 | Park | H04B 7/04 |
| 2018/0123772 | A1* | 5/2018 | Wang | H04B 7/0417 |
| 2018/0241454 | A1* | 8/2018 | Lee | H04B 7/06 |
| 2019/0007112 | A1* | 1/2019 | Faxer | H04B 7/0456 |
| 2019/0058560 | A1* | 2/2019 | Chen | H04B 7/0413 |
| 2019/0260453 | A1* | 8/2019 | Huang | H04B 7/0469 |
| 2019/0273547 | A1* | 9/2019 | Onggosanusi | H04L 1/0026 |
| 2019/0341982 | A1* | 11/2019 | Park | H04B 7/0473 |

\* cited by examiner (A) CONTROL-PLANE PROTOCOL STACK (B) USER-PLANE PROTOCOL STACK

METHOD FOR TRANSMITTING FEEDBACK INFORMATION FOR DM-RS BASED DOWNLINK TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/003570, filed on Mar. 31, 2017, which claims the benefit of U.S. Provisional Application No. 62/316,549, filed on Mar. 31, 2016, the contents of which are all hereby incorporated by reference herein in their entirety.

TECHNICAL FIELD

The present invention relates to a wireless communication system, and more particularly, to a method of transmitting feedback information for DM-RS based downlink transmission in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of transmitting feedback information for DM-RS based downlink transmission in a wireless communication system and apparatus therefor.

Technical Solutions

In one technical aspect of the present invention, provided herein is a method of reporting Channel Status Information (CSI) for a Demodulation-Reference Signal (DM-RS) based downlink transmission through multiple layers to a base station by a user equipment in a wireless access system, the method including receiving a Channel Status Information-Reference Signal (CSI-RS) from the base station, calculating the CSI based on the CSI-RS on the assumption that a dual precoder including a first precoder and a second precoder is applied, and reporting the calculated CSI to the base station, wherein column vectors of the second precoder comprise a single Discrete Fourier Transform (DFT) vector.

In another technical aspect of the present invention, provided herein is a method of receiving Channel Status Information (CSI) for a Demodulation-Reference Signal (DM-RS) based downlink transmission through multiple layers by a base station from a user equipment in a wireless access system, the method including transmitting a Channel Status Information-Reference Signal (CSI-RS) to the user equipment and receiving the CSI calculated on the basis of the CSI-RS on the assumption that a dual precoder including a first precoder and a second precoder is applied, wherein column vectors of the second precoder comprise a single Discrete Fourier Transform (DFT) vector.

Preferably, the second precoder may be configured in advance through Radio Resource Control (RRC) layer signaling. On the other hand, the CSI may include at least one of a rank indicator, a channel quality information and an information on the first precoder.

More preferably, the multiple layers may correspond to different antenna ports of the DM-RS. And, the second precoder may apply a same beam to each of the multiple layers.

Additionally, the CSI-RS may be defined as 4 or 8 antenna ports.

Advantageous Effects

According to an embodiment of the present invention, a user equipment can report feedback information for DM-RS based downlink transmission in a wireless communication system more efficiently.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

Figure 1:
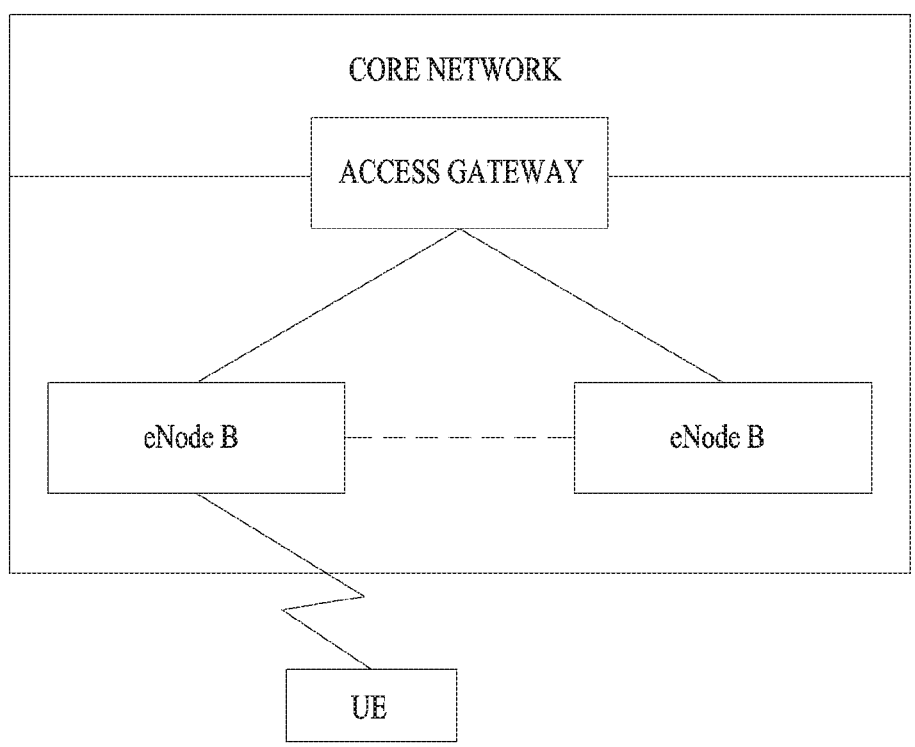
FIG. 1 is a diagram schematically illustrating a network structure of an E-UMTS as an exemplary radio communication system.
Figure 2:
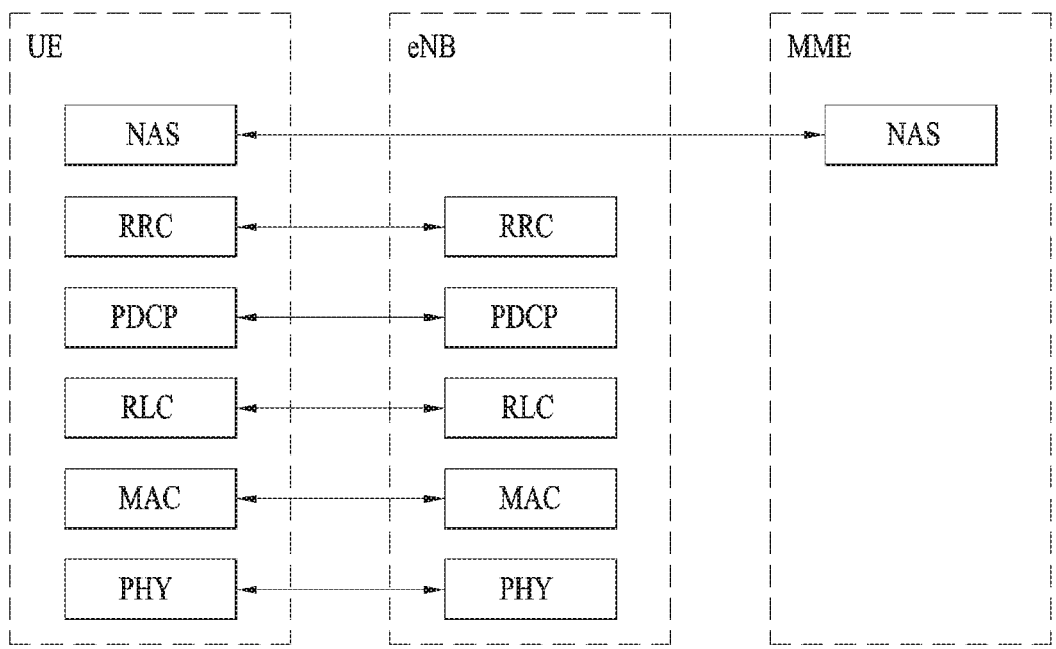
FIG. 2 is a diagram illustrating structures of a control plane and a user plane of a radio interface protocol between a UE and an E-UTRAN based on the 3GPP radio access network specification.
Figure 2:
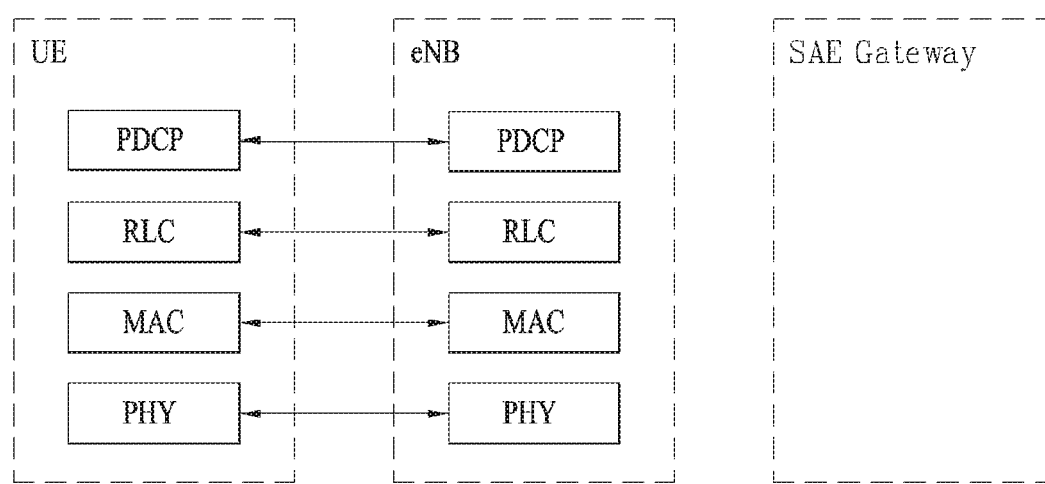

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
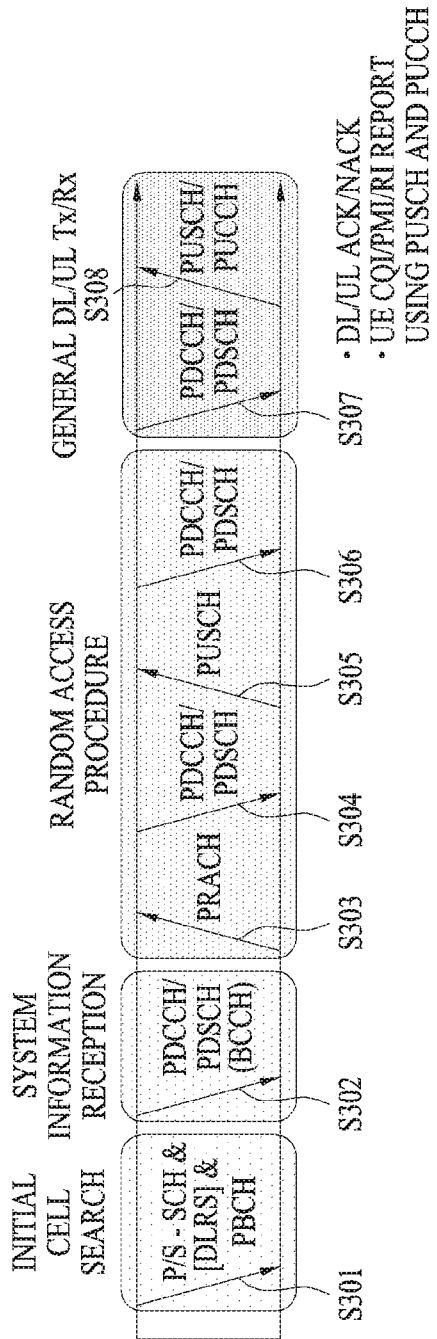
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
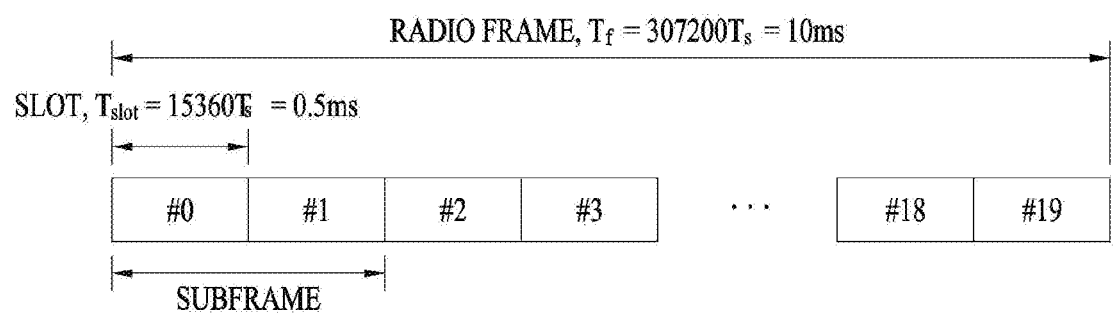
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15\ kHz \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
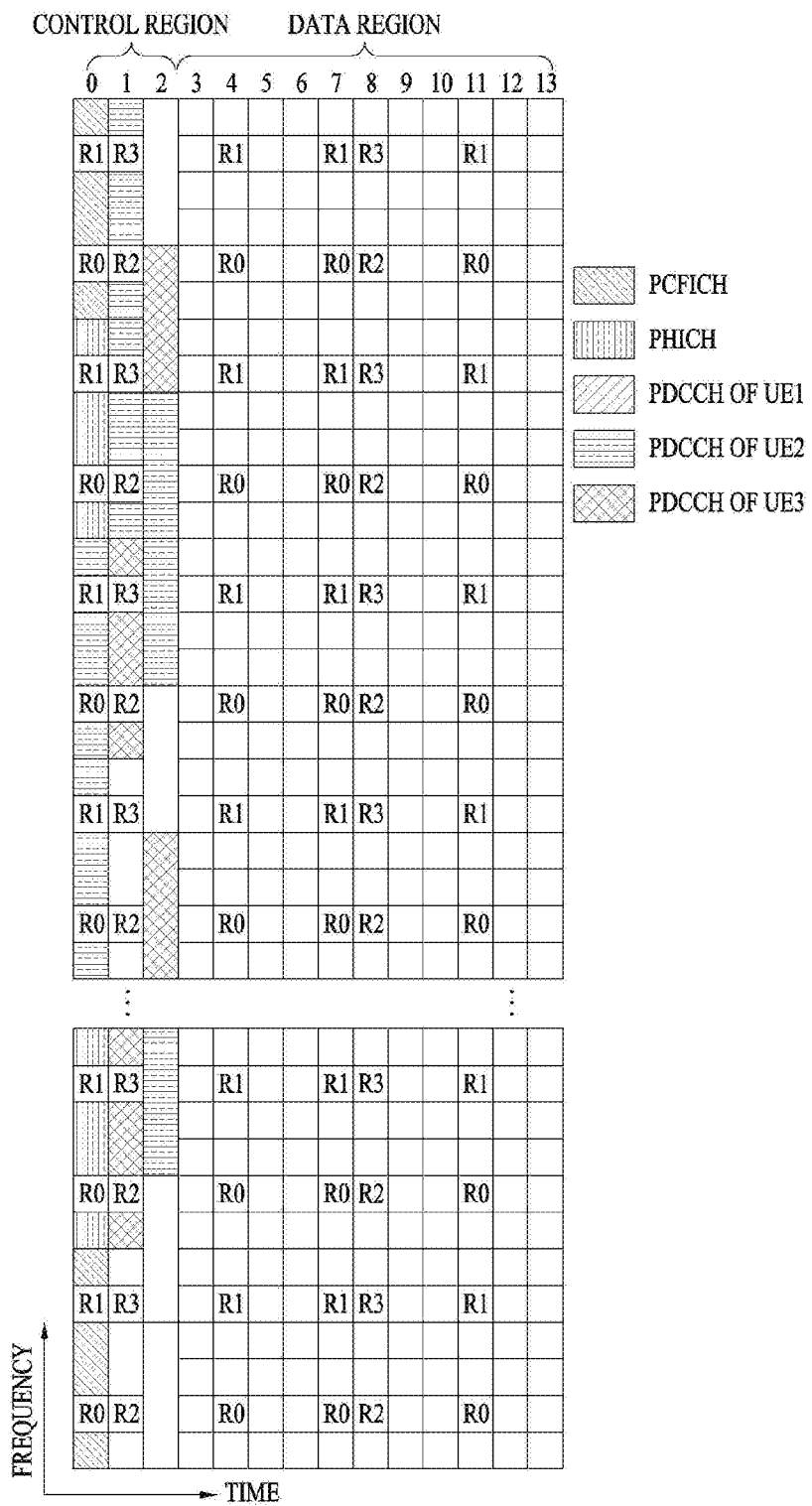
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
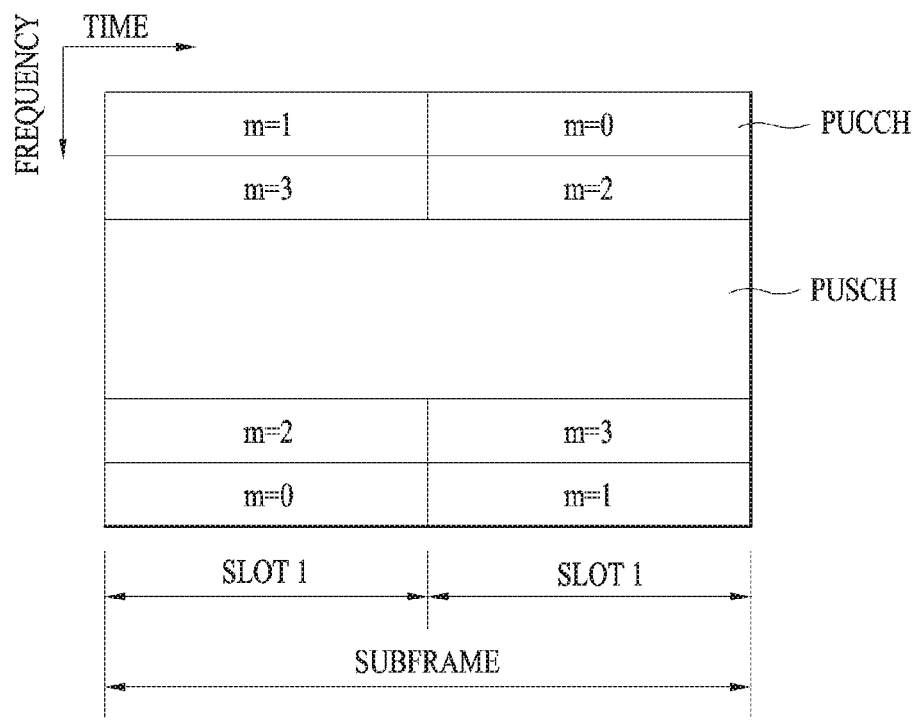
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
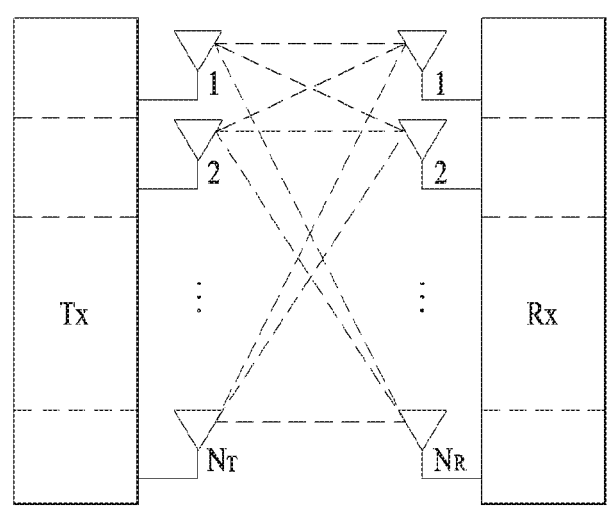
FIG. 7 is a diagram illustrating a configuration of a general MIMO communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, W is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \qquad [\text{Equation 6}]$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \qquad [\text{Equation 7}]$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

A reference signal shall be described in detail as follows.

In general, a reference signal already known to both a transmitting side and a receiving side is transmitted for channel measurement from the transmitting side to the receiving side together with data. Such a reference signal is provided for channel measurement and also plays a role in enabling a demodulation process to be performed by indicating a modulation scheme. Reference signals are classified into Dedicated Reference Signals (DRS) for a base station and a specific UE, i.e., a UE-specific reference signal and a common reference signal (common RS or cell-specific RS) that is a cell-specific reference signal for all UEs in a cell. And, the cell-specific RS includes a reference signal for a UE to measure and report CQI/PMI/RI to a base station, which is referred to as Channel State Information-RS (CSI-RS).

A DM-RS, which is a dedicated reference signal, is supported for PDSCH transmission and antenna port(s) include antenna port p=5, antenna port p=7, and antenna port p=8, or antenna ports p=7, 8 . . . υ+6 (where, υ is the number of layers used for the PDSCH transmission). The DM-RS exists if PDSCH transmission is associated with a corresponding antenna port. And, the DM-RS is a reference valid for demodulation of PDSCH only. The DM-RS is transmitted on RBs, to which the corresponding PDSCH is mapped, only.

Namely, the DM-RS is configured to be transmitted only on PDSCH mapped RB(s) only in a PDSCH scheduled subframe unlike a CRS configured to be transmitted in every subframe irrespective of a presence or non-presence of PDSCH. Moreover, the DM-RS is transmitted via antenna port(s) respectively corresponding to layer(s) of PDSCH only, unlike ta CRS transmitted via all antenna port(s) irrespective of the number of layers of PDSCH. Therefore, overhead of RS can be reduced in comparison with CRS.

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI. Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \qquad [\text{Equation 8}]$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.} \qquad [\text{Equation 9}]$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}}$$

(if rank = r), where $1 \leq k, l, m \leq M$ and $k, l, m$ are integer.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \qquad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
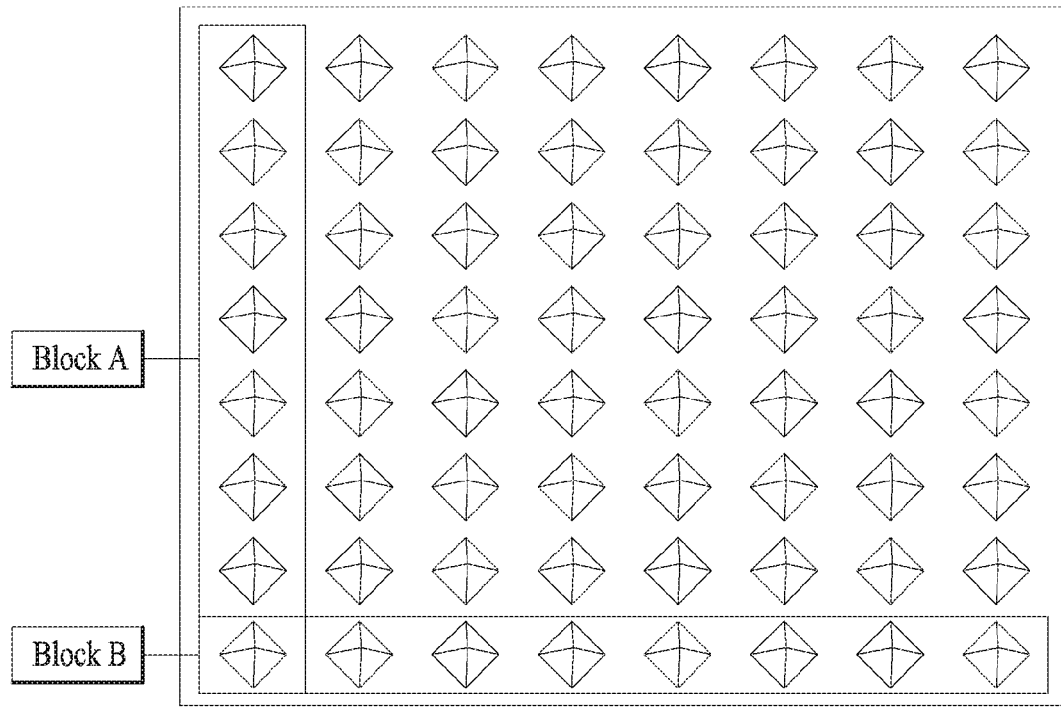
FIG. 8 illustrates an example of implementation of the 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is expected to be constructed as a system having a plurality of antennas by installing antennas in a vertical direction and a horizontal direction.

In a 2D-AAS applied Full Dimension-MIMO (FD-MIMO) system, a base station can configure several CSI-RS resources for a UE in a single CSI process. Here, the CSI process means an operation of feeding back channel information with an independent feedback configuration.

In this case, the UE does not consider a CSI-RS resource configured within a single CSI process as an independent channel, assumes a single huge CSI-RS resource by aggregating the corresponding CSI-RS resources, and calculates & feeds back CSI based on the huge CSI-RS resource. For example, the base station configures three 4-port CSI-RS resources within a signal CSI process for the UE, and the UE assumes a single 12-port CSI-RS resource by aggregating the three 4-port CSI-RS resources. The UE calculates and feeds back CSI using 12-port PMI based on this CSI-RS resource. Such a reporting mode is referred to as Class A CSI reporting in the LTE-A system.

Or, the UE assumes each of the CSI-RS resources as an independent channel, selects one of the CSI-RS resources, and then calculates & reports CSI on the basis of the selected resource. Namely, the UE selects a CSI-RS of a strong channel from the 8 CSI-RS resources, calculates CSI on the basis of the selected CSI-RS, and reports the CSI to the base station. In doing so, the UE additionally reports the selected CSI-RS to the base station via CRI (CSI-RS resource indicator). For example, if a channel of the first CSI-RS corresponding to T(0) is the strongest, the UE sets CRI=0 and then reports it to the base station. Such a reporting mode is referred to as Class B CSI reporting in the LTE-A system.

In order to effectively show the aforementioned characteristic, variables described in the following can be defined for a CSI process in Class B. K means the number of CSI-RS resources existing in the CSI process. $N_k$ means the number of CSI-RS ports of a $k^{th}$ CSI-RS resource.

Prior to describing the present invention, LD-CDD scheme of the current LTE system is examined. Currently, LD-CDD scheme is defined in the LTE system as Equation 11.

$$\begin{bmatrix} y^{(0)}(i) \\ \vdots \\ y^{(P-1)}(i) \end{bmatrix} = W(i)D(i)U = \begin{bmatrix} x^{(0)}(i) \\ \vdots \\ x^{(v-1)}(i) \end{bmatrix} \qquad \text{[Equation 11]}$$

In Equation 11, $x(i)=[x^{(0)}(i) \ldots x^{(v-1)}(i)]^T$ is a data symbol vector to which precoding is not applied. $y(i)=[y^{(0)}(i) \ldots y^{(P-1)}(i)]^T$ is a Tx signal vector to which precoding is applied. Moreover, v and P mean the number of Tx layers and the number of antenna ports, respectively. In Equation 11, W(i) means a precoding matrix for adjusting a channel. Hence, to work to a change of a channel, an appropriate codeword can be selected from a codebook and then used.

Yet, according to the LD-CDD scheme of the current LTE system, a codeword is not selected and used in accordance with a channel situation. W(i) used in the LTE system is expressed as Equation 12.

$$\begin{cases} W(i) = C_1 & \text{for 2 antenna ports} \\ W(i) = C_k, & \\ k = \left(\left\lfloor \frac{i}{v} \right\rfloor \mod 4\right) + 1 \in \{1, 2, 3, 4\} & \text{for 4 antenna ports} \end{cases} \qquad \text{[Equation 12]}$$

In Equation 12, $C_k$ means a codeword. Hence, as a fixed value or a value having a predetermined pattern, W(i) copes with a changing channel.

On the other hand, D(i) and U in Equation 11 play a role in distributing signals of a layer domain to all virtual antennas at the same rate by mixing all Tx layers in a domain. Hence, layers have the same channel quality. Thus, layers are averaged, thereby playing a great role in reducing signal overhead. For example, when a receiving end uses a linear MMSE (minimum mean square error) scheme, it is enough to feed back a single CQI only. And, individual HARQ retransmissions are not necessary for different layers. Therefore, downlink control signaling can be reduced. D(i) and U used in the current LTE system are defined as Table 1.

TABLE 1

| Number of Layers $\upsilon$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The aforementioned LD-CDD system shall be further generalized as follows. In Equation 11, W(i) is defined as a precoder related to a channel, U is generalized into a unitary matrix, and D(i) is generalized into a diagonal matrix in which diagonal terms have a phase difference in the same size like Equation 13.

$$D(i) = \begin{bmatrix} 1 & 0 & \ldots & 0 \\ 0 & e^{j\theta_{1,i}} & \ldots & 0 \\ \vdots & \vdots & \ddots & 0 \\ 0 & 0 & 0 & e^{j\theta_{v-1,i}} \end{bmatrix} \quad \text{[Equation 13]}$$

Looking into Equation 13, it can be observed that D(i) performs a phase shift according to a frequency. If the generalized W(i), D(i) and U are applied to Equation 11, beamforming is performed in a manner that all layers change according to a frequency by D(i) and U. Particularly, a covariance matrix of a tx vector y can be calculated as Equation 14.

$$R_{yy}^{(i)} = E[y(i)(y(i))^H] = W(i)D(i)UU^H(D(i))^H(W(i))^H = W(i)(W(i))^H \quad \text{[Equation 14]}$$

Assuming that W(i) is used as a precoder intending to raise a channel gain using a high eigenvalue of a channel to the maximum, since D(i) and U do not change a covariance matrix of a Tx vector in Equation 14, it can be observed that D(i) and U concentrate on averaging a total layer channel quality by preserving such a channel gain.

As described above, when a base station establishes 2D-AAS, an antenna in a vertical direction is installed as well. According to the legacy LD-CDD scheme, a diversity gain is obtained by changing beams in a horizontal direction alternately. Hence, in order to obtain a more diversity gain, a 2D-AAS base station preferably changes a beam in a vertical direction as well. Therefore, an LD-CDD scheme of changing a beam in a vertical direction together has been proposed recently.

Yet, the LD-CDD scheme of changing a beam in a vertical direction together has a problem. Basically, according to the LD-CDD scheme of the current LTE system, a base station and a UE are aware of the precoder like Equation 8 in advance. The base station informs the UE of a channel from horizontal antenna ports to the UE through CRS for the horizontal antenna port, and the UE becomes aware of a final channel by applying the precoder to the channel obtained through the CRS. Here, if the 2D-AAS installed base station uses the precoder for a vertical beam by changing it, CRS ports may be required as many as the total number of antenna ports of the base station. Yet, since CRS is currently defined as 4 antenna ports, a DM-RS based LD-CDD scheme is proposed. According to the current LTE standard, LD-CDD transmission is possible up to 8 layers using DM-RS.

<DM-RS Based DL Transmission Scheme>

As DM-RS based DL transmission schemes, transmission schemes 1) to 6) are proposed as follows.

Transmission Scheme 1)

$$\begin{bmatrix} y^{(7)}(i) \\ \vdots \\ y^{(7+(P\_DMRS-1))}(i) \end{bmatrix} = D(i)U \begin{bmatrix} x^{(0)}(i) \\ \vdots \\ x^{(\upsilon-1)}(i) \end{bmatrix} \quad \text{[Equation 15]}$$

$$\begin{bmatrix} y^{(15)}(i) \\ \vdots \\ y^{(15+(P\_CSIRS-1))}(i) \end{bmatrix} = W(n_{RB}) \begin{bmatrix} r^{(7)}(i) \\ \vdots \\ r^{(7+(\upsilon-1))}(i) \end{bmatrix} \quad \text{[Equation 16]}$$

In Equation 15, $x(i)=[x^{(0)}(i) \ldots x^{(\upsilon-1)}(i)]^T$ and $y(i)=[y^{(7)}(i) \ldots y^{7+(P\_DMRS-1)}(i)]^T$ mean a data symbol vector and a DM-RS port, respectively. $\upsilon$ and P_DMRS mean the number of Tx layers and the number of DM-RS ports, respectively. $\upsilon$ and P_DMRS are equal to each other. Data x is precoded by DU and then transmitted through DM-RS port 7 to port 7+(p_DM-RS-1).

U is a DFT matrix in v-by-v size. D(i) is an element (k,k) and has a value of $e^{-j2pi/\upsilon*(i*k)}$ (where, $k=\{0, 1, \ldots, \upsilon-1\}$). Eventually, D and U are the values simply extended from D and U used by the legacy LD-CDD.

In Equation 16, $r(i)=[r^{(7)}(i) \ldots r^{(7+(\upsilon-1))}(i)]^T$ and $y(i)=[y^{(15)}(i) \ldots y^{15+(P\_CSIRS-1)}(i)]^T$ mean Walsh spreading applied DM-RS sequence and CSI-RS antenna port, respectively. Namely, $r^{(n)}(i)$ is a DM-RS sequence corresponding to a DM-RS port n and is in a Walsh spreading applied state. $\upsilon$ and P_CSIRS mean the number of Tx layers and the number of CSI-RS antenna ports, respectively. DM-RS sequence r is precoded by W and then transmitted through CSI-RS port 15 to port 15+(p_CSI-RS-1).

In Equation 16, W is a precoding matrix having a size of p_CSI-RS by v and can be changed in an RB unit that is the smallest. If PRB bundling is applied, W can be changed in a bundled RB unit. Or, a base station can inform a UE of a unit of a resource for changing W. Moreover, like the legacy LD CDD scheme, W can be changed into one value in a restricted codeword set (e.g., {c1, c2, c3 . . . , ck}). As $n_{RB}$ increases, W can be changed in a manner of circularly rotating from c1 to ck sequentially. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2, by fixing a codeword index of W1 and changing a codeword index of W2, or by fixing a codeword index of W2 and changing a codeword index of W1. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 16, W can be changed in an RB unit that is the smallest. On the other hand, according to the legacy LD CDD scheme, W can be changed in v RE units corresponding to the number of layers. As a result, Transmission scheme 1 has a limited diversity effect obtained from beam cycling in comparison with the legacy LD CDD scheme.

Transmission Scheme 2)

$$\begin{bmatrix} y^{(7)}(i) \\ \vdots \\ y^{(7+(P\_DMRS-1))}(i) \end{bmatrix} = P(i) \begin{bmatrix} x^{(0)}(i) \\ \vdots \\ x^{(v-1)}(i) \end{bmatrix} \quad [\text{Equation 17}]$$

$$\begin{bmatrix} y^{(15)}(i) \\ \vdots \\ y^{(15+(P\_CSIRS-1))}(i) \end{bmatrix} = W(n_{RB})D(0)U \begin{bmatrix} r^{(7)}(i) \\ \vdots \\ r^{(7+(v-1))}(i) \end{bmatrix} \quad [\text{Equation 18}]$$

In Equation 17, $x(i)=[x^{(0)}(i) \ldots x^{(v-1)}(i)]^T$ and $y(i)=[y^{(7)}(i) \ldots y^{7+(P\_DMRS-1)}(i)]^T$ mean a data symbol vector and a DM-RS port, respectively. v and P_DMRS mean the number of Tx layers and the number of DM-RS ports, respectively. v and P_DMRS are equal to each other. Data x is layer-permutated by a permutation matrix P and then transmitted through DM-RS port 7 to port 7+(p_DM-RS−1). P(0) is defined as an identity matrix in v-by-b size, and P(i) is generated by circularly rotating a row vector position of P(0). For example, if v=3, P can be defined as Equation 19.

$$P(i) = \begin{cases} \begin{bmatrix} 1 & 0 & 0 \\ 0 & 1 & 0 \\ 0 & 0 & 1 \end{bmatrix}, & \text{when } i \% 3 = 0 \\ \begin{bmatrix} 0 & 1 & 0 \\ 0 & 0 & 1 \\ 1 & 0 & 0 \end{bmatrix}, & \text{when } i \% 3 = 1 \\ \begin{bmatrix} 0 & 0 & 1 \\ 1 & 0 & 0 \\ 0 & 1 & 0 \end{bmatrix}, & \text{when } i \% 3 = 2 \end{cases} \quad [\text{Equation 19}]$$

In Equation 18, $r(i)=[r^{(7)}(i) \ldots r^{(7+(v-1))}(i)]^T$ and $y(i)=[y^{(15)}(i) \ldots y^{15+(P\_CSIRS-1)}(i)]^T$ mean a Walsh spreading applied DM-RS sequence and a CSI-RS antenna port, respectively. Namely, r(V) is a DM-RS sequence corresponding to a DM-RS port n and is in a Walsh spreading applied state. v and P_CSIRS mean the number of Tx layers and the number of CSI-RS antenna ports, respectively. A DM-RS sequence r is precoded by WD(0)U and then transmitted through CSI-RS port 15 to port 15+(p_CSI-RS−1).

U is a DFT matrix in v-by-v size. D(i) is an element (k,k) and has a value of $e^{-j2pi/v*(i*k)}$ (where, k={0, 1, . . . , v−1}). Eventually, D and U are the values simply extended from D and U used by the legacy LD-CDD.

In Equation 18, W is a precoding matrix having a size of p_CSI-RS by v and can be changed in an RB unit that is the smallest. If PRB bundling is applied, W can be changed in a bundled RB unit. Or, a base station can inform a UE of a unit of a resource for changing W. Moreover, like the legacy LD CDD scheme, W can be changed into one value in a restricted codeword set (e.g., {c1, c2, c3 . . . , ck}). As $n_{RB}$ increases, W can be changed in a manner of circularly rotating from c to ck in sequence. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2 in a manner of cycling them, by fixing a codeword index of W1 or fixing it to a feedback value and changing a codeword index of W2 in a manner of cycling it, or by fixing a codeword index of W2 or fixing it to a feedback value and changing a codeword index of W1 in a manner of cycling it. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 18, W can be changed in an RB unit that is the smallest. On the other hand, according to the legacy LD CDD scheme, W can be changed in unit of v REs corresponding to the number of Tx layers. As a result, Transmission scheme 2 also has a limited diversity effect obtained from beam cycling in comparison with the legacy LD CDD scheme.

Simply, both D and U in Equation 18 can be configured by being substituted with identity matrix. In this case, the same performance can be obtained. In addition, a layer permutation function may not be used by setting P in Equation 17 to an identity matrix all the time. A base station may determine whether to use the layer permutation function commonly and then inform a UE of the determination. And, in a random transmission scheme as well as Transmission scheme 2, the base station can activate or deactivate layer permutation using such signaling.

Transmission Scheme 3)

$$\begin{bmatrix} y^{(7)}(i) \\ \vdots \\ y^{(7+(P\_DMRS-1))}(i) \end{bmatrix} = W(i)D(i)U \begin{bmatrix} x^{(0)}(i) \\ \vdots \\ x^{(v-1)}(i) \end{bmatrix} \quad [\text{Equation 20}]$$

$$\begin{bmatrix} y^{(15)}(i) \\ \vdots \\ y^{(15+(P\_CSIRS-1))}(i) \end{bmatrix} = \begin{bmatrix} r^{(7)}(i) \\ \vdots \\ r^{(7+(P\_DMRS-1))}(i) \end{bmatrix} \quad [\text{Equation 21}]$$

In Equation 20, $x(i)=[x^{(0)}(i) \ldots x^{(v-1)}(i)]^T$ and $y(i)=[y^{(7)}(i) \ldots y^{7+(P\_DMRS-1)}(i)]^T$ mean a data symbol vector and a DM-RS port, respectively. v and P_DMRS mean the number of Tx layers and the number of DM-RS ports, respectively. v and P_DMRS are equal to each other. Data x is precoded by DU and then transmitted through DM-RS port 7 to port 7+(p_DM-RS−1).

U is a DFT matrix in v-by-v size. D(i) is an element (k,k) and has a value of $e^{-j2pi/v*(i*k)}$ (where, k={0, 1, ..., v−1}). Eventually, D and U are the values simply extended from D and U used by the legacy LD-CDD.

In Equation 20, W is a precoding matrix having a size of p_CSI-RS by v and can be changed in an RB unit that is the smallest. Or, a base station can inform a UE of a unit of a resource for changing W. Moreover, like the legacy LD CDD scheme, W can be changed into one value in a restricted codeword set (e.g., {c1, c2, c3 ..., ck}). As i increases, W can be changed in a manner of circularly rotating from c to ck in sequence. The base station can inform the UE of the restricted codeword set through RRC signaling.

As a codebook over 4 ports is defined as a dual codeword structure, W can be expressed as W1*W2. W may be changed by changing both a codeword index i1 of W1 and a codeword index of W2, by fixing a codeword index i1 of W1 and changing a codeword index of W2, or by fixing a codeword index i2 of W2 and changing a codeword index of W1. How to make a codeword set of W using one of the three ways can be RRC-signaled to the UE by the base station.

In Equation 21, $r(i)=[r^{(7)}(i) \ldots r^{(7+(v-1))}(i)]^T$ and $y(i)=[y^{(15)}(i) \ldots y^{15+(P\_CSIRS-1)}(i)]^T$ mean Walsh spreading applied DM-RS sequence and CSI-RS antenna port, respectively. Namely, $r^{(n)}(i)$ is a DM-RS sequence corresponding to a DM-RS port n and is in a Walsh spreading applied state. P_DMRS and P_CSIRS mean the number of DM-RS ports and the number of CSI-RS antenna ports, respectively. A DM-RS sequence r is 1:1 mapped and transmitted through CSI-RS port 15 to port 15+(p_CSI-RS−1). P_DMRS and P_CSIRS are equal to each other.

In Transmission scheme 3), unlike Transmission scheme 1) and Transmission scheme 2), beam cycling by w is applied between a data x and a DM-RS port y. According to the beam cycling, when a candidate of W is defined as a specific set, a value of W is determined in a manner of sequential circular rotation of a specific element in the set according to a frequency-time resource for transmitting data. Hence, although demodulation is performed with DM-RS, W can be changed in unit of v REs corresponding to the number of Tx layers like the legacy LD CCD scheme. As a result, in comparison with Transmission scheme 1) or Transmission scheme 2), Transmission scheme 3 has the great diversity effects obtained from the beam cycling.

In Transmission scheme 1) and Transmission scheme 2), the number of data layers is equal to the number of DM-RS ports. Yet, in Transmission scheme 3, the number of DM-RS ports is equal to the number of CSI-RS ports. For example, in case of using 8-port CSI-RS, 8-port DM-RS is configured for a UE. Hence, Transmission scheme 3) has the number of DM-RS ports, which is greater than that of Transmission scheme 1) or Transmission scheme 2). As a result, DM-RS overhead increases, thereby reducing transmission power per DM-RS port.

If a UE performs feedback on W and a base station performs beam cycling using the fed-back W [i.e., semi-open-loop based transmission scheme], e.g., if beam cycling for a final W is performed by using a fed-back value for W1 and applying a predetermined beam cycling to W2 in a dual codebook structure, the base station should inform the UE of W information applied to the data transmission through DCI according to Transmission scheme 3). Hence, in the above example, W1 is indicated through DCI and a beam cycling scheme previously determined without signaling is applied to W2.

Moreover, since the number of DM-RS ports may be different from the number of Tx layers, the base station should inform the UE of the number of Tx layers through DCI together with DM-RS port.

In case that the mapping between data and DM-RS port depends on W like Transmission scheme 3) or Transmission scheme 4) mentioned later, i.e., when W is applied to data and the data is transmitted through DM-RS port, if the UE feeds back partial information of W in form of a semi-open loop, the base station should indicate whether precoding was performed by applying the information in case of data transmission (through DCI). If not applying the information, the base station should indicate that precoding was performed by applying a prescribed value substituted for the information (through DCI). Or, without separate signaling, the base station and the UE agree that data is precoded by applying the latest information or the most recent information in partial information of W previously fed back by the UE in a subframe #(n−m) on the assumption that a data transmission timing is a subframe # n. Here, m can be RRC-signaled to the UE by the base station or fixed to a specific value.

Transmission Scheme 4)

$$\begin{bmatrix} y^{(7)}(i) \\ \vdots \\ y^{(7+(P\_DMRS-1))}(i) \end{bmatrix} = W_{Data}(i)D(i)U \begin{bmatrix} x^{(0)}(i) \\ \vdots \\ x^{(v-1)}(i) \end{bmatrix} \quad [\text{Equation 22}]$$

$$\begin{bmatrix} y^{(15)}(i) \\ \vdots \\ y^{(15+(P\_CSIRS-1))}(i) \end{bmatrix} = W_{DMRS}(n_{RB}) \begin{bmatrix} r^{(7)}(i) \\ \vdots \\ r^{(7+(P\_DMRS-1))}(i) \end{bmatrix} \quad [\text{Equation 23}]$$

In Transmission scheme 4, in order to alleviate the aforementioned disadvantage of Transmission scheme 3, W(i) in Transmission scheme 3 is defined in a manner of being divided into a precoder $W_{DM-RS}$ applied between DM-RS port and CSI-RS port and a precoder $W_{Data}$ applied between data and DM-RS port. $W_{DM-RS}$ is a matrix in size of P_CSI-RS by P_DM-RS, and satisfies P_CSI-RS>P_DM-RS>=v. As a result, the number of DM-RS Tx ports in Transmission scheme 4) is reduced in comparison with Transmission scheme 3).

According to Transmission scheme 4), a wide beam having small time variation is generated in consideration of a channel and then applied to DM-RS transmission through $W_{DM-RS}$, and a narrow beam having large time variation is applied to data transmission through $W_{Data}$. So to speak, it can be understood that a diversity effect is obtained in a manner of reducing antenna dimension with an antenna having P_DM-RS ports by applying $W_{DM-RS}$ fed back by the UE to an antenna having P_CSI-RS ports and then changing $W_{Data}$ through beam cycling for the reduced antenna ports.

Moreover, according to the semi-open-loop scheme, a UE feeds $W_{DM-RS}$ back to a base station. The base station then transmits DM-RS using the corresponding value. On the other hand, $W_{Data}$ (i.e., precoder applied between data and DM-RS) is beam-cycled by a determined beam cycling without feedback. Therefore, DCI signaling for $W_{Data}$ is necessary for Transmission scheme 4).

In Transmission scheme 4), as the DM-RS port number may be different from the Tx layer number, the base station should inform the UE of the transmission layer number through DCI together with DM-RS port.

A detailed example of Transmission scheme 4) is described as follows.

Figure 9:
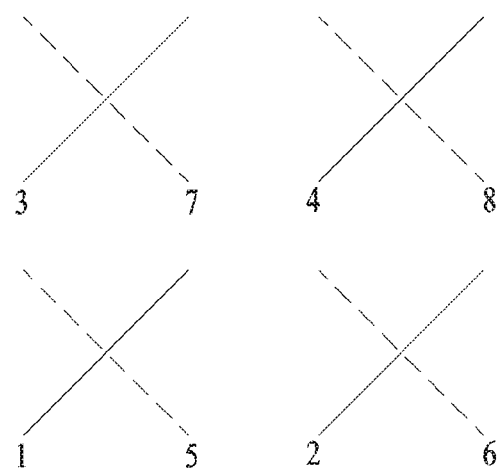
FIG. 9 shows a 2D X-pol antenna array and a corresponding 8-port CSI-RS.

FIG. 9 shows a 2D X-pol antenna array and a corresponding 8-port CSI-RS.

Transmission scheme 4) is described with reference to FIG. 9 as follows. A UE feeds back a PMI, which is to be applied to a vertical antenna, to a base station. Using this PMI, the base station determines $W_{DM-RS}$. As a result, DM-RS port 7 is transmitted through CSI-RS port 1 and CSI-RS port 3 by applying $W_{DM-RS}$. DM-RS port 8 is transmitted through CSI-RS port 2 and CSI-RS port 4 by applying $W_{DM-RS}$. DM-RS port 9 is transmitted through CSI-RS port 5 and CSI-RS port 7 by applying $W_{DM-RS}$. And, DM-RS port 10 is transmitted through CSI-RS port 6 and CSI-RS port 8 by applying $W_{DM-RS}$.

Therefore, the number of DM-RS ports is determined as 4 and the DM-RS ports have a structure of a vertical antenna array (horizontal antenna array). Moreover, a previously determined beam cycling scheme according to a frequency i is applied to W applied between data and DM-RS ports.

A UE feeds back a PMI, which is to be applied to a vertical antenna, to a base station. And, the base station determines $W_{DM-RS}$ and $W_{Data}$ using the PMI. Such a process is described in detail as follows.

Class A codebook defined for 2D antenna array is determined as a combination of PMI (i1) of W1 and PMI (i2) of W2. And, i1 consists of a combination of i11 and i12. For example, i11 determines a DFT vector set applied to a vertical antenna and i12 determines a DFT vector set applied to a horizontal antenna. In some cases, i11 may indicate a DFT vector set of a horizontal antenna and i12 may indicate a DFT vector set of a vertical antenna. In order to determine $W_{DM-RS}$, the UE feeds back i1 to the base station, and the base station calculates i11 from i1. Or, the UE may directly feed i11 back to the base station. In doing so, the UE calculates i1 in a following manner.

Optimal i1 is calculated by changing both i11 and i12 just as it was.

If there exists a beam cycling scheme previously determined for i12, i11 is calculated in a state that a beam cycling is applied to i12. Although an optimal i11 value is found, since i12 is cycled, an index of i1 is changed. Hence, i1 is calculated with reference to the found i11 value and a first i12 value that becomes a circular rotation target.

Now, the base station discovers a DFT vector v ($=[1\ \exp(j\theta)]^T$), which is to be applied to a vertical antenna, from i11. In this case, according to an RRC-signaled codebook configuration value, there is a case that a single vector exists in a DFT vector set corresponding to i11 or a case that two or more vectors exist therein. For example, according to codebook configuration 1 or 4, since a single vector exists in a DFT vector set corresponding to i11, v can be determined as an i11 value. On the other hand, according to codebook configuration 2 or 3, two vectors exist in a DFT vector set corresponding to i11 and a single vector is selected by i2. In this case, v is determined by the following methods.

According to a first method, a UE additionally feeds back i2 and determines v through i11 and i2 values. According to a second method, v is determined as a vector always located in a specific position among several vectors in a DFT vector set. For example, v is determined as a first vector always existing in a set. According to a third method, a UE does not expect that a base station sets a codebook configuration to 2 or 3 in an OL transmission scheme and the base station may not set the codebook configuration to 2 or 3. $W_{DM-RS}$ is calculated using v as Equation 24.

$$W_{DMRS}(n_{RB}) = \begin{bmatrix} 1 & 0 & 0 & 0 \\ 0 & 1 & 0 & 0 \\ e^{j\theta} & 0 & 0 & 0 \\ 0 & e^{j\theta} & 0 & 0 \\ 0 & 0 & 1 & 0 \\ 0 & 0 & 0 & 1 \\ 0 & 0 & e^{j\theta} & 0 \\ 0 & 0 & 0 & e^{j\theta} \end{bmatrix} \quad [\text{Equation 24}]$$

In order to determine $W_D a$, a general structure of codeword generated from a class A code book need to be described. First of all, Equation 25 shows a general structure of codeword generated from the class A codebook. In the equation, an i-column vector is configured in a manner of finding a column vector by applying Kronecker product to a DFT vector $v_i$ (in size of # of vertical antennas by 1) and a DFT vector $h_i$ (in size of # of horizontal antennas by 1), concatenating the column vector in a column direction, and then multiplying a lower column vector by a phase rotation value of $\alpha_i$. Here, $\alpha_i$ may be referred to as co-phase.

$$\begin{bmatrix} v_1 \otimes h_1 & v_2 \otimes h_2 & \ldots & v_k \otimes h_k \\ \alpha_1(v_1 \otimes h_1) & \alpha_2(v_2 \otimes h_2) & \ldots & \alpha_k(v_k \otimes h_k) \end{bmatrix} \quad [\text{Equation 25}]$$

A base station and a UE can calculate $W_{Data}$ by substituting $V_i \otimes h_i$ with $h_i$ in Equation 25. Namely, it is calculated as Equation 26.

$$W_{Data}(i) = \quad [\text{Equation 26}]$$
$$f\left(\begin{bmatrix} v_1 \otimes h_1 & v_2 \otimes h_2 & \ldots & v_k \otimes h_k \\ \alpha_1(v_1 \otimes h_1) & \alpha_2(v_2 \otimes h_2) & \ldots & \alpha_k(v_k \otimes h_k) \end{bmatrix}\right) =$$
$$\begin{bmatrix} h_1 & h_2 & \ldots & h_k \\ \alpha_1(h_1) & \alpha_2(h_2) & \ldots & \alpha_k(h_k) \end{bmatrix}$$

In order to apply a beam cycling to $W_{Data}$, a base station and a UE can change i1 and i2 according to a determined beam cycling scheme. In this case, by generating the codeword expressed in Equation 25 in a manner of fixing i11 to a fed-back value and changing i12 and i2 and substituting $V_i \otimes h_i$ with $h_i$, it is able to make $W_{Data}$ expressed in Equation 26.

Transmission Scheme 5)

The following Transmission scheme 5) may be regarded as one example of the aforementioned Transmission scheme 2).

$$\begin{bmatrix} y^{(7)}(i) \\ \vdots \\ y^{(7+(P\_DMRS-1))}(i) \end{bmatrix} = P(i) \begin{bmatrix} x^{(0)}(i) \\ \vdots \\ x^{(v-1)}(i) \end{bmatrix} \quad [\text{Equation 27}]$$

$$\begin{bmatrix} y^{(15)}(i) \\ \vdots \\ y^{(15+(P\_CSIRS-1))}(i) \end{bmatrix} = W(n_{RB}) \begin{bmatrix} r^{(7)}(i) \\ \vdots \\ r^{(7+(v-1))}(i) \end{bmatrix} \quad [\text{Equation 28}]$$

In Equation 27, $x(i)=[x^{(0)}(i) \ldots x^{(v-1)}(i)]^T$ and $y(i)=[y^{(7)}(i) \ldots y^{7+(P\_DMRS-1)}(i)]^T$ mean a data symbol vector and a DM-RS port, respectively. v and P_DMRS mean the number of Tx layers and the number of DM-RS ports, respectively. v and P_DMRS are equal to each other. Data x is layer-permutated by a permutation matrix P and then transmitted through DM-RS port 7 to port 7+(p_DM-RS−1). P(0) is defined as an identity matrix in v-by-v size, and P(i) is generated by circularly rotating a row vector position of P(0). For example, if v=3, P can be defined as Equation 19. Simply, P(i) can be always configured as an identity matrix in v-by-v size and then transmitted without layer permutation. In this case, Transmission scheme 5 is identical to the legacy DM-RS based downlink transmission scheme.

In Equation 28, $r(i)=[r^{(7)}(i) \ldots r^{(7+(v-1))}(i)]^T$ and $y(i)=[y^{(15)}(i) \ldots y^{15+(P\_CSIRS-1)}(i)]^T$ mean a Walsh spreading applied DM-RS sequence and a CSI-RS antenna port, respectively. Namely, $r^{(n)}(i)$ is a DM-RS sequence corresponding to a DM-RS port n and is in a Walsh spreading applied state. v and P_CSIRS mean the number of Tx layers and the number of CSI-RS antenna ports, respectively. A DM-RS sequence r is precoded by W and then transmitted through CSI-RS port 15 to port 15+(p_CSI-RS−1).

In Equation 28, W is a precoding matrix having a size of p_CSI-RS by v and can be changed in an RB unit that is the smallest. If PRB bundling is applied, W can be changed in unit of bundled RBs. (Or, a base station can inform a UE of a unit of a resource for changing W.) Moreover, like the legacy LD CDD scheme, W can be changed into one value in a restricted codeword set (e.g., {c1, c2, c3 . . . , ck}). As $n_{RB}$ increases, W can be changed in a manner of circularly rotating from c to ck in sequence. The base station can inform the UE of the restricted codeword set through RRC signaling.

As a codebook over 4 ports is defined as a dual codeword structure, W can be expressed as W1*W2. W may be changed by changing both a codeword index of W1 and a codeword index of W2, by fixing a codeword index i1 of W1 and changing a codeword index of W2, or by fixing a codeword index i2 of W2 and changing a codeword index of W1. How to make a codeword set of W using one of the three ways can be RRC-signaled to the UE by the base station.

DM-RS is the structure transmitted in a manner of having the same beam applied in an RB unit. If PRB bundling is applied, DM-RS is a structure transmitted in a manner of having the same beam applied in a bundled RB unit. As a result, in Equation 28, W can be changed in an RB unit that is the smallest. On the other hand, according to the legacy LD CDD scheme, W can be changed in v RE units (where, v is the number of Tx layers). As a result, a diversity effect obtained from beam cycling may be limited in comparison with the legacy LD CDD scheme.

Transmission scheme 6)

$$\begin{bmatrix} y^{(7+f(i))}(i) \\ \vdots \\ y^{(7+f(i)+(v-1))}(i) \end{bmatrix} = D(i)U \begin{bmatrix} x^{(0)}(i) \\ \vdots \\ x^{(v-1)}(i) \end{bmatrix}$$ [Equation 29]

$$\begin{bmatrix} y^{(15)}(i) \\ \vdots \\ y^{(15+(P\_CSIRS-1))}(i) \end{bmatrix} = [W^1(n_{RB}) \ W^2(n_{RB})] \begin{bmatrix} r^{(7)}(i) \\ \vdots \\ r^{(7+(v-1))}(i) \\ r^{(7+(v))}(i) \\ \vdots \\ r^{(7+(2v-1))}(i) \end{bmatrix}$$ [Equation 30]

In the aforementioned Transmission scheme 1, as W is cycled in an RB unit or a bundled RB unit, the diversity effect reduction due to beam cycling is described. For extreme example, as a size of downlink (DL) data is small, if the data is transmitted on a single RB, beam cycling is not applied at all in Transmission scheme 1). Transmission scheme 6) is characterized in applying beam cycling even within an RB by solving such a problem.

Whether to apply Transmission scheme 6) may be determined depending on the number of scheduled RBs of DL data. For example, the number of scheduled RBs is equal to or smaller than N, Transmission scheme 6) is used. If the number of scheduled RBs is equal to or greater than N, other transmission schemes are usable. Of course, the N value can be RRC-signaled to a UE by a base station.

Although the DM-RS port number is equal to the layer number in Transmission scheme 1), the DM-RS port number is determined as a multiplication of the layer number and the number of beams beam-cycled in a single RB in Transmission scheme 6). Here, in case of applying PRB bundling, the single RB can be substituted with a bundled RB.

Equation 30 shows the relationship between a DM-RS port and a CSI-RS port on the assumption of an example that two beams (i.e., {$W^1(nRB)$, $W^2(nRB)$}) are beam-cycled within a single RB. Each of $W^1(nRB)$ and $W^2(nRB)$ is a layer v (=rank v) precoding matrix, which is usable for an antenna of P_CSI-RS ports, in a size of P_CSI-RS by v. Each value of $W^1(nRB)$ and $W^2(nRB)$ can be changed in an RB unit or a bundled RB unit. According to Equation 30, a $W^1(nRB)$ applied effective channel is generated through DM-RS port 7 to port 7+v−1 and a $W^2(nRB)$ applied effective channel is generated through DM-RS port 7+v to port 7+2v−1.

Equation 29 shows the relationship between data and DM-RS port. Compared with Equation 15 of Transmission scheme 1), Equation 29 shows that an offset 'f(i)' is added to a port index. The f(i) is determined by the number of beams beam-cycled in a single RB and the layer number v. Assuming that the number of beams is 2, the f(i) is equal to 0 or v. For example, it is able to set $$f(i) = \left(\left\lfloor \frac{i}{v} \right\rfloor \mod 2\right) v.$$

As a result, x(0), x(1), . . . , x(v−1) are transmitted through DM-RS port 7 to port 7+v−1, and x(v), x(v+1), . . . , x(2v−1) are transmitted through DM-RS port 7+v to port 7+2v−1. Hence, as 'i' continues to increase, transmission ports are changed in such a pattern.

If the number of beams beam-cycled in a single RB is extended to N by generalizing Transmission scheme 6), Equation 29 and Equation 30 are changed into Equation 31 and Equation 32, respectively.

$$\begin{bmatrix} y^{(7+f(i))}(i) \\ \vdots \\ y^{(7+f(i)+(v-1))}(i) \end{bmatrix} = D(i)U \begin{bmatrix} x^{(0)}(i) \\ \vdots \\ x^{(v-1)}(i) \end{bmatrix}, \text{where} \quad \text{[Equation 31]}$$

$$f(i) = \left(\left\lfloor \frac{i}{v} \right\rfloor \bmod N\right)v$$

$$\begin{bmatrix} y^{(15)}(i) \\ \vdots \\ y^{(15+(P\_CSIRS-1))}(i) \end{bmatrix} = \quad \text{[Equation 32]}$$

$$[W^1(n_{RB}) \ W^2(n_{RB}) \ \ldots \ W^N(n_{RB})] \begin{bmatrix} r^{(7)}(i) \\ \vdots \\ r^{(7+(v-1))}(i) \\ r^{(7+(v))}(i) \\ \vdots \\ r^{(7+(2v-1))}(i) \\ \vdots \\ r^{(7+(N-1)(v))}(i) \\ \vdots \\ r^{(7+(Nv-1))}(i) \end{bmatrix}$$

All Equations 29 to 32 relate to transmission schemes that enable beam cycling within a single RB by modifying Transmission scheme 1). The rest of transmission schemes can be modified to enable the beam cycling within a single RB by the same principles. For example, by modifying Transmission scheme 2) in the following manner, beam cycling can be performed within a single RB. DU is substituted with a permutation matrix P(i) in Equation 31, and $W^i(n_{RB})$ is substituted with $W^i(n_{RB})D(0)U$ in Equation 32.

For another example, in case of Transmission scheme 4), by substituting DU and $W^i(n_{RB})$ with $W_{data}(i)D(i)U$ and $W_{DM-RS}{}^i(n_{RB})$ in Equation 31 and Equation 32, respectively, beam cycling is enabled within a single RB as well.

For another example, in case of Transmission scheme 5, by substituting DU with a permutation matrix P(i) in Equation 31 and always setting P(i) to an identity matrix in Equation 32 despite setting Equation 32 intact, beam cycling is enabled within a single RB as well.

<CSI Feedback for DM-RS Based Downlink Transmission>

In order to support the above-described various transmission schemes, a UE should calculate and feed back CSI by a new method. If a class A CSI process is configured in an open-loop or semi-open-loop transmission scheme, in order to simplify an operation, restriction can be put in a manner of applying a specific codebook configuration only. For example, in an open-loop or semi-open-loop transmission scheme, restriction can be always put in a manner of 'codebook configuration=4'. In the following a CSI feedback method for a DM-RS based open-loop transmission scheme and a CSI feedback method for a DM-RS based semi-open-loop transmission scheme are separately described.

A) CSI Feedback Method for a DM-RS Based Open-Loop Transmission Scheme

In open-loop CSI feedback, a UE feeds back RI and CQI only to a base station like LD CDD transmission. Equation 33 shows the relationship between CSI-RS port and data, which is assumed by a UE in a CSI calculation process, in case of applying the aforementioned Transmission scheme 1) or 2).

$$\begin{bmatrix} y^{(15)}(i) \\ \vdots \\ y^{(15+(P\_CSIRS-1))}(i) \end{bmatrix} = W(n_{RB})D(i)U \begin{bmatrix} x^{(0)}(i) \\ \vdots \\ x^{(v-1)}(i) \end{bmatrix} \quad \text{[Equation 33]}$$

where $W(n_{RB})=C(i_1, i_2)$ and $i_1=f_1(n_{RB})$, $i_2=f_2(n_{RB})$

C is a dual codebook defined as two PMIs i1 and i2, and such a dual codebook is used for CSI-RS of 4 ports or more. f1 and f2 are functions for determining i1 and i2 according to $n_R$, respectively, and RB-unit beam cycling is performed according to f1 and f2. Of course, if PRB bundling is applied, $n_{RB}$ is substituted not with an index of a single RB but with an index of a bundled RB and beam cycling in a bundled RB unit is performed. As a result, W is determined through beam cycling in a beam set {C(i1, i2)|i1=f1($n_{RB}$), i2=f2($n_{RB}$)}.

In case of using Transmission scheme 3), a UE calculates CSI by changing $W(n_R)$ into W(i) in Equation 33. As a result, beam cycling is enabled not in an RB unit but in an RE unit. (Of course, a factor of each of f1 and f2 should be changed into i from nRB.) Eventually, resolution in a beam cycling unit is changed only but a beam cycling scheme mentioned in the following is applicable intactly.

CSI feedback for Transmission scheme 4) shall be described in a CSI feedback method for a DM-RS based semi-open-loop transmission scheme mentioned in the following.

In case of using Transmission scheme 5), a UE calculates CSI by changing DU into P(i) in Equation 33. Eventually, a presence or non-presence of application of U is changed only and the beam cycling method in the following is applicable intactly.

First of all, in case of configuring a class B CSI process (where, K=1) or a legacy CSI process, beam cycling is described.

First of all, it is able to consider a beam cycling method by changing i1 and i2 both.

In case of Release-12 8Tx Codebook, a set of DFT vectors determined as i consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2.

Next, it is able to consider a beam cycling method by fixing i1 but changing i2 only.

In case of Release-12 4Tx Codebook, a set of DFT vectors determined as i1 consists of lowly correlated vectors (orthogonal to each other). Hence, although i1 is fixed to a specific value (e.g., 0), a set is configured with DFT vectors indicating various channel directions. And, i2 selects some vectors from the vector set determined as i1 and also selects a phase rotation value α. Namely, i2 selects v from a vector set and also selects α, whereby each column vector of a final codeword matrix is generated in form of [vT α vT]T.

Since a DFT vector v configuring each column vector in a rank 2 codeword may be differentiated or equalized according to an i2 value, it can be cycled in a manner of being limited to i2, which equalizes v that configures two column vectors, for beam cycling. On the contrary, it can be cycled in a manner of being limited to i2 that differentiates v configuring two column vectors. Or, i2 can be cycled in a state that α is fixed to a single value without being changed.

Moreover, in case of Release-12 8Tx Codebook, since a set of DFT vectors determined as i1 consists of highly correlated vectors, if i1 is fixed to a specific value (e.g., 0), a set is configured with DFT vectors indicating a specific channel direction. Hence, it is not preferable that i1 is fixed.

Next, it is able to consider a beam cycling method by changing i1 but fixing i2.

In case of Release-12 8Tx Codebook, since a set of DFT vectors determined as i1 consists of highly correlated vectors, it is preferable that beam is cycled by changing i1. The i2 can be restricted to use a vector always located at a specific location only within a DFT vector set and a phase rotation of i2 can be fixed to a single value.

In case of Release-12 4Tx Codebook, since a set of DFT vectors determined as i1 consists of lowly correlated vectors (orthogonal to each other), if i2 is fixed but i1 is changed, selected DFT vectors may be configured with highly correlated vectors. Hence, it is not preferable that beam cycling is performed in a manner of changing i1 but fixing i2.

Particularly, the present invention proposes to perform a beam cycling by changing i1 in case of Release-12 8Tx Codebook or a beam cycling by fixing i1 but changing i2 in case of Release-12 4Tx Codebook.

A beam cycling in case of configuring a class A CSI process is described as follows.

It is able to consider a beam cycling method by changing i1 and i2 both.

In case of Release-13 Class A Codebook, a DFT vector set determined as i1 consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2.

It is able to consider a beam cycling method by fixing i1 but changing i2 only.

In case of Release-13 Class A Codebook, since a DFT vector set determined as i1 consists of highly correlated vectors. Hence, if i1 is fixed to a specific value (e.g., 0), a set is configured with DFT vectors indicating a specific channel direction. Hence, it is not preferable that i1 is fixed.

A beam cycling method by changing i1 but fixing i2 is considered as well.

In case of Release-13 Class A Codebook, a DFT vector set determined as i1 consists of highly correlated vectors. Hence, it is preferable that beam is cycled by changing i1. Moreover, i2 can be restricted to use a vector always located at a specific location only within a DFT vector set and a phase rotation of i2 can be fixed to a single value.

B) CSI Feedback Method for a DM-RS Based Semi-Open-Loop Transmission Scheme

In CSI feedback for DM-RS based semi-open-loop transmission, a UE feeds back CRI or i1 or i11 to a base station as well as RI and CQI. Equation 35 shows the relationship between CSI-RS port and data, which is assumed by a UE in a CSI calculation process, in case of applying Transmission scheme 1), Transmission scheme 2), or Transmission scheme 4).

$$\begin{bmatrix} y^{(15)}(i) \\ \vdots \\ y^{(15+(P\_CSIRS-1))}(i) \end{bmatrix} = W(n_{RB})D(i)U \begin{bmatrix} x^{(0)}(i) \\ \vdots \\ x^{(v-1)}(i) \end{bmatrix}$$ [Equation 34]

where $W(n_{RB})=C(i_1, i_2)$ and $i_2=f_2(n_{RB})$

A UE for which a class A CSI process, a class B CSI process or a legacy CSI process is configured can feed back i1. In this case, the UE finds optimal i1 from Equation 34 and then feeds back the found optimal i1. Namely, CQI and RI are not calculated by changing i1 by a beam cycling scheme determined using $i_1=f_1(n_{RB})$. Instead, the UE reports optimal i1, which maximizes a CQI for all i1 values possible under the QoS met condition, to the base station. In this case, i2 is determined by a beam cycling scheme determined by f2.

Or, a UE having a class A CSI process configured therefor can feed back i11. In this case, the UE finds optimal i11 from Equation 34 and then feeds it back. Since $i_1$ is determined as i11 and i12, the i12 is changed according to a beam cycling scheme determined using $i_{12}=f_{12}(n_{RB})$ and optimal i11, which maximizes CQI for all i11 values possible under the QoS met condition, to a base station. In this case, i2 is determined by a beam cycling scheme determined by f2. In case that the UE feeds back i11, since a feedback payload is decreased in comparison with i1, it can be reported together with an RI. In some implementations, a k value is additionally defined over rank 3. In this case, i1 is determined as k, i11, i12. It is preferable that k is operated in a manner of being always fixed to a single value (e.g., 0) in a semi-open-loop transmission scheme or an open-loop transmission scheme.

In case of a semi-open-loop scheme in which a UE feeds back CRI only without feedback of i1 or i11, it is substantially identical to CSI calculation in an open-loop scheme. Since CRI just determines whether to perform channel estimation becoming a CSI calculation target on which BF CSI-RS, a CSI calculation scheme is not different from that of an open-loop scheme.

In case of using Transmission scheme 3, a UE calculates CSI by changing $W(n_{RB})$ into W(i) in Equation 34. As a result, beam cycling is enabled not in an RB unit but in an RE unit. Of course, a factor of f3 should be also changed into i from $n_{RB}$. Eventually, a beam cycling unit is changed only but a beam cycling scheme in the following is applicable intactly.

In case of using Transmission scheme 5, a UE calculates CSI by changing DU into P(i) in Equation 34. Eventually, a presence or non-presence of application of U is changed only but a beam cycling scheme in the following is applicable intactly.

First of all, in case of configuring a class B CSI process or a legacy process, a beam cycling is described as follows.

In case of a scheme of a beam cycling by changing both i1 and i2, if a UE feeds back i1, since i1 is determined as the corresponding value, this scheme is not applicable.

Let's consider a scheme of performing a beam cycling in a manner of fixing i1 but changing i2 only.

In case that a UE feeds back i1, i1 is determined as the corresponding value and a determined beam cycling scheme is applied to i2. Hence, as described above, this is a beam cycling scheme appropriate for a 4Tx codebook. Yet, in case of a middle-speed (e.g., 30 km or lower) UE, as a channel does not change vary fast, a scheme of cycling a beam in a manner of fixing i1 to a fed-back value but changing i2 only may be valid for an 8Tx codebook as well.

Finally, in case of a scheme of performing a beam cycling in a manner of changing i1 but fixing i2, if a UE feeds back i1, as i1 is determined as the corresponding value, this scheme is not applicable.

In the following, a beam cycling in case of configuring a class A CSI process is described.

Let's consider a scheme of performing a beam cycling by changing both i1 and i2.

In case of Release-13 class A codebook, a DFT vector set determined as i1 consists of highly correlated vectors. Hence, a beam is preferably cycled by changing i1. And, i2 may be restricted to use a vector at a specific position in a DFT vector set only all the time. Yet, beam cycling is performed by changing a phase rotation value of i2.

In case that a UE feeds back i1, a value of i11 is determined from i1. And, i12 performs a beam cycling in a determined manner. As a result, a vertical beam is fixed by receiving feedback from the UE but a beam cycling is applied to a horizontal beam. Generally, a vertical velocity of a UE is not fast but a horizontal velocity of the UE is fast. Hence, using this scheme, data can be transmitted in a vertical direction by a closed-loop scheme and data can be transmitted in a horizontal direction by an open-loop scheme. Of course, a scheme of performing a beam cycling on i11 by determining an i12 value from i1.

On the other hand, if the UE feeds back i11, i11 is determined as the corresponding value and i12 performs a determined beam cycling scheme. Additionally, the UE may feed back i12 instead of i11. Through separate signaling, the base station may inform the UE which one of i11 or i12 will be fed back. Or, the UE can report one of i11 and i12 to the base station.

Consider a scheme of performing a beam cycling by fixing i1 but changing i2 only.

In case that a UE feeds back i1, i1 is determined as the corresponding value and i2 is cyclically applied by a determined scheme. In case of a middle-speed (e.g., 30 km or lower) UE, as a channel does not change vary fast, a scheme of cycling a beam in a manner of fixing i1 to a fed-back value but changing i2 only may be valid.

Finally, in case of a scheme of performing a beam cycling in a manner of changing i1 but fixing i2, although this scheme operates in the same manner as a scheme of performing a beam cycling by changing both i1 and i2, i2 is fixed yet.

<Definition of Beam Cycling Set>

Meanwhile, as described in the following, by defining a beam cycling set, it is able to perform a beam cycling in a resource unit (e.g., RB unit, bundled RB unit, RE unit amounting to the number of layers, etc.) determined within the corresponding set. In doing so, a base station can differently operate a beam cycling set according to a size of a scheduled RB. For example, if the number of scheduled RBs is equal to or smaller than M, a beam cycling set 1 is used. If the number of scheduled RBs is greater than M, a beam cycling set 2 is used.

(1) Beam Cycling Set in 4 Tx Codebook for Rank 2

For clarity of description, a 4 Tx codebook for rank 2 is exemplarily shown in Table 2.

TABLE 2

| | | $i_2$ | | |
|---|---|---|---|---|
| $i_1$ | 0 | 1 | 2 | 3 |
| 0-15 | $W_{i_1, i_1, 0}^{(2)}$ | $W_{i_1, i_1, 1}^{(2)}$ | $W_{i_1+8, i_1+8, 0}^{(2)}$ | $W_{i_1+8, i_1+8, 1}^{(2)}$ |
| | | $i_2$ | | |
| $i_1$ | 4 | 5 | 6 | 7 |
| 0-15 | $W_{i_1+16, i_1+16, 0}^{(2)}$ | $W_{i_1+16, i_1+16, 1}^{(2)}$ | $W_{i_1+24, i_1+24, 0}^{(2)}$ | $W_{i_1+24, i_1+24, 1}^{(2)}$ |
| | | $i_2$ | | |
| $i_1$ | 8 | 9 | 10 | 11 |
| 0-15 | $W_{i_1, i_1+8, 0}^{(2)}$ | $W_{i_1, i_1+8, 1}^{(2)}$ | $W_{i_1+8, i_1+16, 0}^{(2)}$ | $W_{i_1+8, i_1+16, 1}^{(2)}$ |
| | | $i_2$ | | |
| $i_1$ | 12 | 13 | 14 | 15 |
| 0-15 | $W_{i_1, i_1+24, 0}^{(2)}$ | $W_{i_1, i_1+24, 1}^{(2)}$ | $W_{i_1+8, i_1+24, 0}^{(2)}$ | $W_{i_1+8, i_1+24, 1}^{(2)}$ | where $W_{m,m',n}^{(2)} = \frac{1}{\sqrt{8}} \begin{bmatrix} v_m' & v_{m'}' \\ \varphi_n v_m' & -\varphi_n v_{m'}' \end{bmatrix}$ Particularly, in table 2, $\phi_n = e^{j\pi n/2}$ and $v_m' = [1 \ e^{j2\pi m/32}]^T$.

First of all, i1 is fixed to 0 or uses a value fed back by a UE, thereby not being cycled.

Alt 1: A beam cycling set of i2 is {0, 1, 4, 5}. A vector selected through 'i2=0 or 1' from DFT vectors defined as i1 is orthogonal to a vector selected through 'i2=1 or 5'. A phase rotation value of W determined through 'i2=0 or 4' is different from a phase rotation value of W determined through 'i2=1 or 5'. Eventually, the cycling beams determined as combinations of i1 and i2 are configured with DFT vectors orthogonal to each other or have different phase rotation values, thereby being configured with beams in various (or different) directions to obtain a diversity effect.

Alt 2: A beam cycling set of i2 is {0, 2, 4, 6}. A vector selected through 'i2=0' from DFT vectors defined as i1 is orthogonal to a vector selected through 'i2=4'. Moreover, a vector selected through 'i2=2' is orthogonal to a vector selected through 'i2=6'. A phase rotation value of W is equal for all i2 values. Eventually, the cycling beams determined as combinations of i1 and i2 are configured with various DFT vectors orthogonal to each other despite having the same phase rotation value, thereby being configured with beams in various (or different) directions to obtain a diversity effect.

Alt 3: A set is configured with a union of two sets Alt 1 and Alt 2.

Alt 4: A beam cycling set of i2 is {0, 4, 8, 10}. In Alt 1, a DFT vector configuring two beams (corresponding to two layers) is always the same. For more various beamformings, {8, 10} is added by ignoring such restrictions.

Alt 5: A beam cycling set of i2 is {0, 4, 8, 12}. In Alt 1, a DFT vector configuring two beams (corresponding to two layers) is always the same. For more various beamformings, {8, 12} is added by ignoring such restrictions.

Alt 6: A beam cycling set of i2 is {0, 4, 9, 11}. In Alt 2, a DFT vector configuring two beams (corresponding to two layers) is always the same and a phase shift value is the same as well. For more various beamformings, {9, 11} is added by ignoring such restrictions.

Alt 7: A beam cycling set of i2 is {0, 4, 9, 13}. In Alt 2, a DFT vector configuring two beams (corresponding to two layers) is always the same and a phase shift value is the same as well. For more various beamformings, {9, 13} is added by ignoring such restrictions.

(2) Beam Cycling Set in 8 Tx Codebook for Rank 2

For clarity of description, an 8 Tx codebook for rank 2 is exemplarily shown in Table 2.

TABLE 3

| $i_1$ | $i_2$ | | | |
|---|---|---|---|---|
| | 0 | 1 | 2 | 3 |
| 0-15 | $W_{2i_1, 2i_1, 0}^{(2)}$ | $W_{2i_1, 2i_1, 1}^{(2)}$ | $W_{2i_1+1, 2i_1+1, 0}^{(2)}$ | $W_{2i_1+1, 2i_1+1, 1}^{(2)}$ |
| | $i_2$ | | | |
| $i_1$ | 4 | 5 | 6 | 7 |
| 0-15 | $W_{2i_1+2, 2i_1+2, 0}^{(2)}$ | $W_{2i_1+2, 2i_1+2, 1}^{(2)}$ | $W_{2i_1+3, 2i_1+3, 0}^{(2)}$ | $W_{2i_1+3, 2i_1+3, 1}^{(2)}$ |
| | $i_2$ | | | |
| $i_1$ | 8 | 9 | 10 | 11 |
| 0-15 | $W_{2i_1, 2i_1+1, 0}^{(2)}$ | $W_{2i_1, 2i_1+1, 1}^{(2)}$ | $W_{2i_1+1, 2i_1+2, 0}^{(2)}$ | $W_{2i_1+1, 2i_1+2, 1}^{(2)}$ |
| | $i_2$ | | | |
| $i_1$ | 12 | 13 | 14 | 15 |
| 0-15 | $W_{2i_1, 2i_1+3, 0}^{(2)}$ | $W_{2i_1, 2i_1+3, 1}^{(2)}$ | $W_{2i_1+1, 2i_1+3, 0}^{(2)}$ | $W_{2i_1+1, 2i_1+3, 1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$ Particularly, in Table 3, $\phi_n = e^{j\pi n/2}$ and $v_m = [1\ e^{j2\pi m/32}\ e^{j4\pi m/32}\ e^{j6\pi m/32}]^T$.

First of all, i1 is fixed to 0 or uses a value fed back by a UE, thereby not being cycled.

Alt 1: A beam cycling set of i2 is {0, 1, 4, 5}. A vector selected through 'i2=0 or 1' from DFT vectors defined as i1 has high correlation to a vector selected through 'i2=4 or 5'. A phase rotation value of W determined through 'i2=0 or 4' is different from a phase rotation value of W determined through 'i2=1 or 5'. Eventually, the cycling beams determined as combinations of i1 and i2 are configured with DFT vectors highly correlated to each other or have different phase rotation values, thereby being configured with beams in various (or different) directions to obtain a diversity effect. Since a beam cycling is performed within a DFT vector having high correlation, a UE preferably reports i1 in semi-open-loop and an appropriate velocity of the UE includes a middle velocity (e.g., 30 km).

Alt 2: A beam cycling set of i2 is {0, 2, 4, 6}. Vectors selected through 'i2=0, 2, 4, 6' from DFT vectors defined as i1 are highly correlated to each other. A phase rotation value of W is equal for all i2 values. Eventually, the cycling beams determined as combinations of i1 and i2 are configured with highly correlated DFT vectors having the same phase rotation value, thereby obtaining a diversity effect within a beam in a similar direction. Therefore, a UE preferably reports i1 in semi-open-loop and an appropriate velocity of the UE includes a middle velocity (e.g., 30 km).

Alt 3: A set is configured with a union of two sets Alt 1 and Alt 2.

Alt 4: A beam cycling set of i2 is {0, 4, 8, 10}. In Alt 1, a DFT vector configuring two beams (corresponding to two layers) is always the same. For more various beamformings, {8, 10} is added by ignoring such restrictions.

Alt 5: A beam cycling set of i2 is {0, 4, 8, 12}. In Alt 1, a DFT vector configuring two beams (corresponding to two layers) is always the same. For more various beamformings, {8, 12} is added by ignoring such restrictions.

Alt 6: A beam cycling set of i2 is {0, 4, 9, 11}. In Alt 2, a DFT vector configuring two beams (corresponding to two layers) is always the same and a phase shift value is the same as well. For more various beamformings, {9, 11} is added by ignoring such restrictions.

Alt 7: A beam cycling set of i2 is {0, 4, 9, 13}. In Alt 2, a DFT vector configuring two beams (corresponding to two layers) is always the same and a phase shift value is the same as well. For more various beamformings, {9, 13} is added by ignoring such restrictions.

Figure 10:
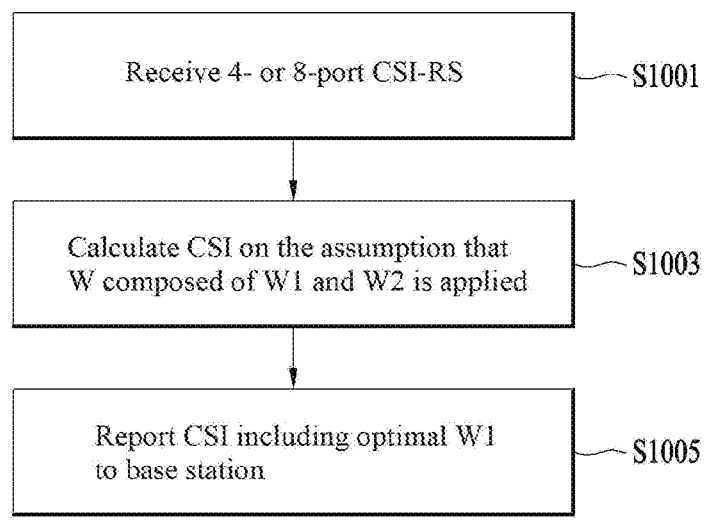
FIG. 10 is a flowchart for an example of a method for performing CSI feedback for DM-RS based downlink transmission through multiple layers according to an embodiment of the present invention.

FIG. 10 is a flowchart for an example of a method for performing CSI feedback for DM-RS based downlink transmission through multiple layers according to an embodiment of the present invention.

Referring to FIG. 10, in a step 1001, a UE receives a Channel Status Information-Reference Signal (CSI-RS) from a base station. Here, if a CSI-RS is defined as 4 or 8 antenna ports, the present invention assumes a case of applying a dual codebook.

Subsequently, in a step 1003, on the assumption that a dual precoder including a first precoder and a second precoder is applied, the UE calculates the CSI based on the CSI-RS. In this case, column vectors of the second precoder consist of a single Discrete Fourier Transform (DFT) vector and is configured in advance through Radio Resource Control (RRC) layer signaling. Namely, the second precoder performs an open-loop operation. Particularly, since the multiple layers correspond to different antenna ports of the DM-RS, respectively, the second precoder plays a role in applying the same beam to each of the multiple layers.

Finally, in a step 1005, the UE reports the calculated CSI to the base station. In doing so, information on the first precoder is preferably included together with a rank indicator and a channel quality information.

Figure 11:
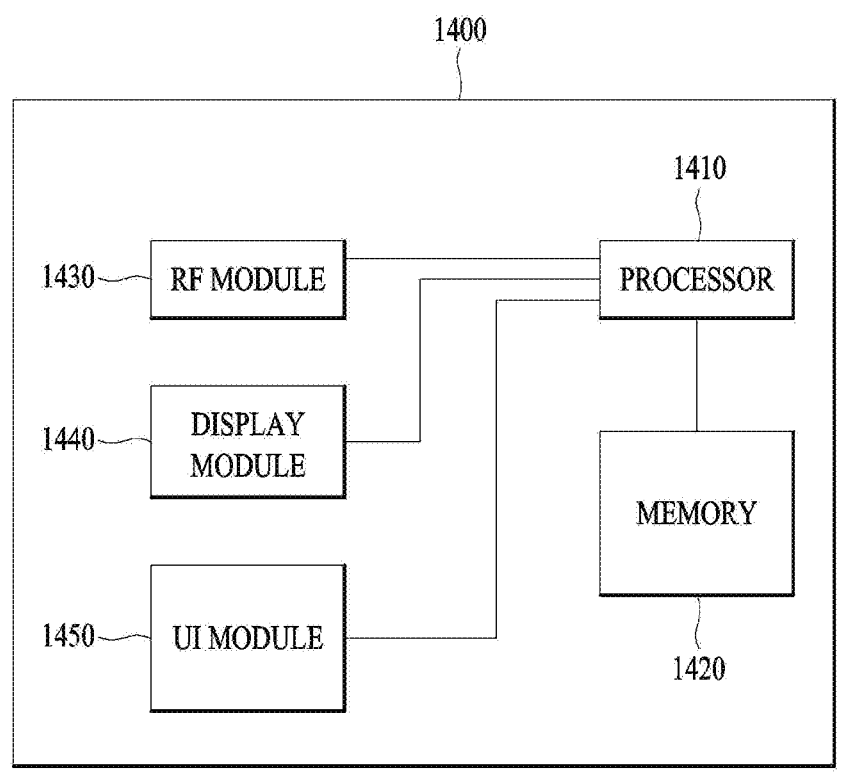
FIG. 11 is a block diagram of a communication apparatus according to an embodiment of the present invention.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of transmitting feedback information for DM-RS based downlink transmission in a wireless communication system and apparatus therefor are described centering on examples applying to the 3GPP LTE system, they are applicable to various wireless communication systems as well as to the 3GPP LTE system.

What is claimed is:

1. A method of reporting Channel Status Information (CSI) for a Demodulation-Reference Signal (DM-RS) based downlink transmission through dual layers to a base station by a user equipment in a wireless access system, the method comprising:
receiving a Channel Status Information-Reference Signal (CSI-RS) from the base station;
calculating the CSI based on the CSI-RS on an assumption that a dual precoder including a first precoder and a second precoder is applied; and
reporting the CSI to the base station, the CSI including at least one of a rank indicator, channel quality information or information on the first precoder,
wherein the second precoder is configured from one of precoders defined by two column vectors, and
wherein the two column vectors are identical.

2. The method of claim 1, wherein the dual layers correspond to different antenna ports of the DM-RS.

3. The method of claim 1, wherein the second precoder applies a same beam to each of the dual layers.

4. The method of claim 1, wherein the received CSI-RS is defined as 4 or 8 antenna ports.

5. A method of receiving Channel Status Information (CSI) for a Demodulation-Reference Signal (DM-RS) based downlink transmission through dual layers by a base station from a user equipment in a wireless access system, the method comprising:
transmitting a Channel Status Information-Reference Signal (CSI-RS) to the user equipment; and
receiving the CSI including at least one of a rank indicator, channel quality information or information on a first precoder of a dual precoder,
wherein the CSI is calculated by the user equipment based on the CSI-RS on an assumption that the dual precoder including the first precoder and a second precoder is applied,
wherein the second precoder is configured from one of precoders defined by two column vectors, and
wherein the two column vectors are identical.

6. The method of claim 5, wherein the dual layers correspond to different antenna ports of the DM-RS.

7. The method of claim 5, wherein the second precoder applies a same beam to each of the dual layers.

8. The method of claim 5, wherein the received CSI-RS is defined as 4 or 8 antenna ports.

* * * * *